United States Patent [19]
Karino et al.

[11] Patent Number: 6,000,049
[45] Date of Patent: Dec. 7, 1999

[54] PHYSICAL PACKAGING POSITION INFORMATION PROCESSING SYSTEM

[75] Inventors: Toshiyuki Karino; Tadashi Meguro, both of Tokyo, Japan

[73] Assignee: NEC Corporation, Tokyo, Japan

[21] Appl. No.: 08/883,451

[22] Filed: Jun. 26, 1997

[30] Foreign Application Priority Data

Jun. 28, 1996 [JP] Japan ..................................... 8-169389

[51] Int. Cl.⁶ ................................................. G01R 31/28
[52] U.S. Cl. ................................. 714/724; 379/1; 714/57
[58] Field of Search ........................... 371/22.1, 48, 57.1; 395/183.07, 183.09, 183.13, 183.22, 185.02, 185.1; 707/1, 100; 714/31, 33, 37, 46, 49, 48, 57, 724, 799, 811; 370/241, 242, 243, 244, 245, 216, 217, 218; 379/1, 9, 10, 14

[56] References Cited

U.S. PATENT DOCUMENTS

| | | | |
|---|---|---|---|
| 4,866,714 | 9/1989 | Adams et al. | 371/22.1 |
| 5,127,012 | 6/1992 | Hiliger | 395/183.22 |
| 5,237,677 | 8/1993 | Hirosawa et al. | 395/185.1 |
| 5,712,989 | 1/1998 | Johnson et al. | 707/1 |

FOREIGN PATENT DOCUMENTS

| | | |
|---|---|---|
| 57-57065 | 4/1982 | Japan . |
| 63-198135 | 8/1988 | Japan . |
| 1-208951 | 8/1989 | Japan . |
| 5-284216 | 10/1993 | Japan . |
| 5-327883 | 12/1993 | Japan . |

*Primary Examiner*—Trinh L. Tu
*Attorney, Agent, or Firm*—Sughrue, Mion, Zinn, Macpeak & Seas, PLLC

[57] ABSTRACT

A physical packaging position processing system of an exchange having exchange proper software and a terminal unit connected to the exchange and having terminal software. The exchange proper software has a system fixed database which is common to the whole of the system and which stores, in a hierarchical structure, a name table of frame unit name, frame name and module name and a name table of module main body name and card name carried in the module. Upon the system construction, a maintenance man prepares a physical packaging position database by utilizing the information of the system fixed database. In the event that a unit packaged in the exchange becomes faulty, a diagnostic result output section obtains physical packaging position information of the faulty unit from the physical packaging database on the basis of a diagnostic result obtained from a diagnostic unit and the physical packaging position information is graphically displayed on a display unit through a graphic display processing section of the terminal software.

3 Claims, 3 Drawing Sheets

FIG. 3

| | | | | | |
|---|---|---|---|---|---|
| 20396-×××  SA836A-OMF ⟵ 41 | | | | S6188ACCPM (33RUNG, 1LINE) | |
| | PHYSICAL PACKAGING INFORMATION 1 | | | MODULE PHYSICAL POSITION 1 | |
| 20397-×××  SA837A-CPF ⟵ 42 | | | | S6188ACCPM (33RUNG, 1LINE) | |
| PHYSICAL PACKAGING INFORMATION 1 | | | | MODULE PHYSICAL POSITION 1 | |

PHYSICAL PACKAGING POSITION INFORMATION PROCESSING SYSTEM

BACKGROUND OF THE INVENTION

The present invention relates to physical packaging position information processing systems and more particularly, to a physical packaging position information processing system which prepares physical packaging position information of units, for example, logical units in an exchange and gives a display of the physical packaging position information to a user or maintenance man.

In order that upon occurrence of a fault of a unit in the exchange, the faulty unit is to be exchanged in accordance with a result of diagnosis executed, packaging information of the unit must be stored in a system before the occurrence of the fault to permit the user to specify a physical position of the faulty unit. Conventionally, storage means for storing packaging information of units in a system, which have different shapes, are located at different positions and information specific to the system is prepared externally in advance so as to be inputted and stored in the storage means.

Further, a processing system is known in which in an electronic computer system provided with a diagnosis unit, package names of all packages in the system are stored in information storing means in correspondence to pieces of package type information and packaging positions of the packages, in respect of individual processing units constituting the system and in the event that a fault occurs, analysis of the fault is carried out and a package name of a specified faulty package is retrieved to correctly indicate the package name during the occurrence of the fault (JP-A-63-198135).

In the prior art system, however, the package system specific information such as information specific to the system and package names must be stored in the storing means, raising a problem that system specific information is required to be stored in respect of individual systems to be consigned and the productivity is degraded. Especially, in the field of exchange, a great number of exchanges are consigned and the number of kinds of units in an exchange is large, with the result that the number of physical packaging positions of units used in combination is drastically large. Accordingly, when the prior art electronic computer system is applied to the exchange, preparation of the system specific information and precedent selection and storage of the information in the system which are to be carried out in advance of the shipment of the exchange need very laborious work and the productivity of the exchange is degraded.

Since the system specific information in the exchange differs for each system, many kinds of system specific information per se are generated in the method of sorting the kinds of hardware in accordance with the system specific information.

On the other hand, system specific information conforming to actual physical packaging positions has not hitherto been prepared upon the installation of an exchange and upon the increase of units and as a result, the operability is degraded. Further, in the past, a physical packaging position of a faulty unit is not displayed and therefore, in the event of the occurrence of a fault, the maintenance man determines the physical packaging position of a faulty unit by looking up, for example, a construction drawing and looks for the position to actually find it out on the spot, thus degrading the maintainability.

SUMMARY OF THE INVENTION

To solve the above conventional drawbacks, an object of the present invention is to provide a physical packaging position information processing system which can improve the productivity of the exchange which is consigned in a large number.

Another object of the present invention is to provide a physical packaging position information processing system which can improve the operability and the maintainability.

To accomplish the above object, according to one aspect of the present invention, in a physical packaging position information processing system comprising an exchange and a terminal unit connected to the exchange, the exchange includes a physical packaging position database for storing physical packaging position information of packaged units in the exchange, and diagnostic result output software means for delivering physical packaging position information corresponding to a diagnosed unit from the physical packaging position database on the basis of a result of a diagnosis executed when the diagnosed unit becomes faulty, and the terminal unit includes change software means for desirably changing the physical packaging position information in the physical packaging position database, a display unit for graphic display, and display processing software means for displaying the physical packaging position information delivered out of the diagnostic result output software means on the display unit.

In the present invention, the physical packaging position of the faulty unit in the exchange is delivered out of the diagnostic result output software means and displayed on the display unit and therefore, the maintenance man can correctly know the faulty unit and its physical packaging position through the indication on the display.

Also, in the present invention, the information change software means copies the physical packaging position information of the physical packaging position database and thereafter, modifies part of the copied information to update the physical packaging position information of the physical packaging position database. Through this, the physical packaging position database can adaptively be prepared more easily.

Further, according to another aspect of the present invention, in a physical packaging position information processing system comprising an exchange having exchange proper software and a terminal unit having terminal software and connected to the exchange, the exchange proper software includes a system fixed database which is common to the whole of the system and which stores, in a hierarchical structure, a name table of frame unit name, frame name and module name and a name table of module main body name and card name carried in the module, a physical packaging position database for storing physical packaging position information of packaged units in the exchange, a packaging position preparation processing section for storing externally inputted physical packaging information in the physical packaging position database, and a diagnostic result output processing section for delivering physical packaging position information corresponding to a diagnosed unit from the physical packaging position database on the basis of a result of a diagnosis executed when the diagnosed unit becomes faulty, and the terminal software includes a unit name determination processing section for determining a desired component name from the system fixed database and storing data of the system fixed database corresponding to the determined unit name, together with physical packaging position information inputted by a user of the terminal unit, in the physical packaging position database through the packaging position preparation processing section, a graphic processing database for displaying data corresponding to the unit name determined by the unit name determination processing section, and a display processing section for displaying the physical packaging position information from the diagnostic result output processing section on a display unit of the terminal unit on the basis of the data from the graphic processing database.

In the present invention, upon the system construction or the increase of units, the user of the terminal unit selects a frame unit name and a module name and inputs physical packaging position information of the frame unit to prepare a physical packaging position database and therefore, the conventional work, in which in advance of shipment of an exchange, all pieces of information such as the frame unit name, the frame name, the module name, the module main body name and the card name are prepared in conformity with various kinds of combinations of units in the exchange and the information pieces are sequentially selected and stored in the exchange, can be unneeded.

BRIEF DESCRIPTION OF THE DRAWINGS

FIG. 3 is a diagram for explaining another example of the physical packaging position database preparing method.

DESCRIPTION OF THE PREFERRED EMBODIMENTS

Embodiments of the present invention will now be described with reference to the accompanying drawings.

Figure 1:
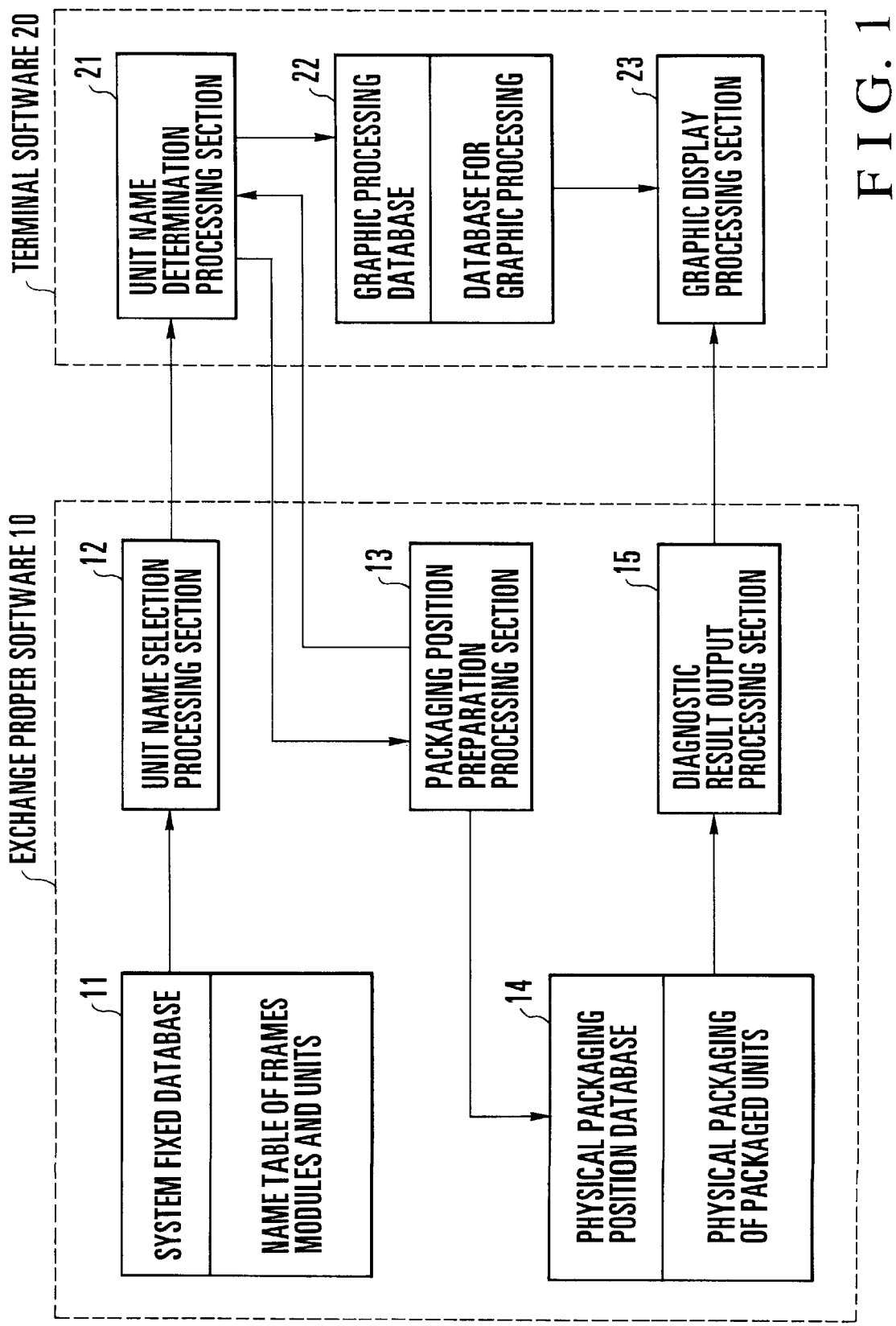
FIG. 1 is a block diagram showing the schematic construction of an embodiment of the present invention.

Referring to FIG. 1, the schematic construction of an embodiment of a physical packaging position information processing system is illustrated in block form. As shown, the system of the present embodiment comprises exchange proper software 10 incorporated in an exchange (not shown) and terminal software 20 incorporated in a terminal unit (not shown) which is provided with a display unit (not shown).

The exchange proper software 10 includes a system fixed database 11 for storing name tables of frames, modules and units such as logical units, a unit name selection processing section 12, a packaging position preparation processing section 13, a physical packaging position database 14 for storing physical packaging positions of packaged units and a diagnostic result output processing section 15. The system fixed database 11 is a fixed database which is common to the whole system and which stores, in a hierarchical structure (tree structure), a name table of frames, frame units accommodated in individual frames, modules accommodated in the individual frames and a name table of module main bodies and cards carried in the modules.

The terminal software 20 includes a unit name determination processing section 21, a graphic processing database 22 which is a database for graphic display and a graphic display processing section 23. The graphic display processing section 23 is for graphically displaying unit names on the display unit.

Figure 2:
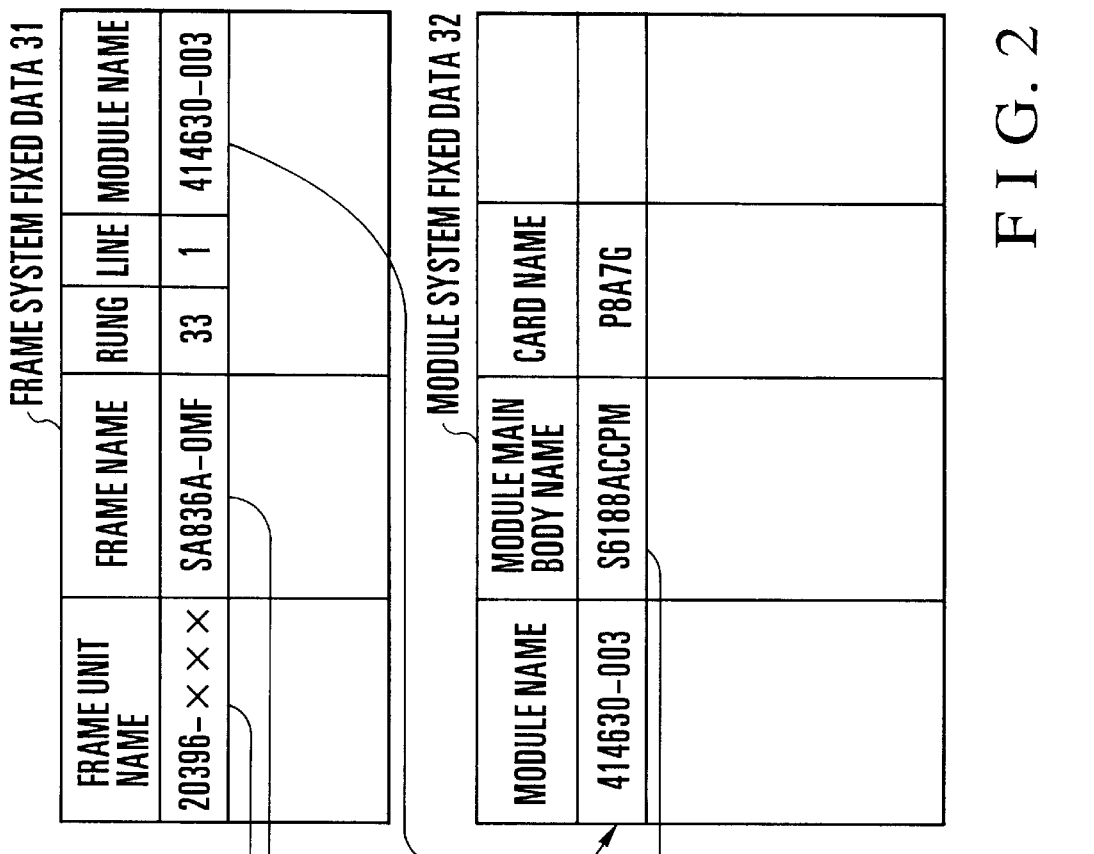
FIG. 2 is a diagram for explaining a method of preparing a physical packaging position database in FIG. 1.

The operation of the present embodiment will now be described with reference to FIGS. 1 and 2. FIG. 2 shows an example for explaining how easily the physical packaging position database 14, which is an important constituent of the embodiment of the present invention, can be prepared. As shown in FIG. 2, the system fixed database 11 carried in the exchange proper software 10 has, for example, frame system fixed data 31 and module system fixed data 32.

The frame system fixed data 31 and module system fixed data 32 have a hierarchical structure and a module accommodated in a frame and a module main body accommodated in the module can be selected without inputting a corresponding card name. To this end, the frame system fixed data 31 has information concerning the frame which is the largest unit of the hardware in the exchange and consists of items of frame unit name, frame name, rung, line, and module name. In other words, the information indicates which rung and which line a frame lies at and which unit (for example, logical unit) and which module are accommodated in the frame.

The name tables of the system fixed database 11 are sent through the unit name selection processing section 12 to the terminal software 20 in the terminal unit connected to the exchange and then displayed on the display unit through the unit name determination processing section 21, graphic processing database 22 and graphic display processing section 23 in the terminal software 20.

A user (usually, a maintenance man) of the terminal unit selects information on a necessary frame unit name from the displayed name table. When the packaging position is erroneous or the packaging position is required to be changed, the user starts an information changing software means, that is, the unit name determination processing section 21 carried in the terminal software 20 to rewrite the packaging position to a correct one so as to determine the frame unit name (frame data).

When the frame unit name is determined, the packaging position preparation processing section 13 in the exchange software 10 is started and the determined frame unit name and an associated series of data (frame data) such as the frame name, the rung and the line are stored, along with physical packaging information of the frame unit name (rewritten, if necessary) inputted by the user, in the physical packaging position database 14. A frame selected at the first turn is processed as an initial physical position and a frame selected at an n-th turn is processed as an n-th physical position. But any desired frame physical position can be selected and can be set as a physical ordinal position desired by the user.

In the terminal software 20, on the other hand, data necessary for the graphic processing is stored in the graphic processing database 22 in accordance with the name of the unit accommodated in the frame and selected by the user. Further, the name of the unit accommodated in the frame and selected by the user, which is sent from the graphic processing database 22, is displayed on the display unit of the terminal unit through the graphic display processing section 23.

When the processing for one frame unit name ends in this manner, the user subsequently selects the name of a module carried in the frame and then consults the module system fixed data 32 of FIG. 2 (selection is not required when there is only one module). The module system fixed data 32 consists of items of module name, module main body name and card name. A predetermined module or modules must be carried in a frame in accordance with the type of the frame and when a certain module name in the frame system fixed data 31 is selected, predetermined module fixed data is displayed to the user.

When only the necessary module name is selected from the data by the user, predetermined module fixed data such as the corresponding module main body name and card name is set in the physical packaging database 14 as shown in FIG. 2. In other word, the module main body name and card name need not be inputted. Like the physical positions of the frames, physical positions of modules can be determined at selection ordinal positions in a predetermined direction or can be determined at positions desired by the user. The term "in a predetermined direction" means a direction from upper rung to lower rung or vice versa which conforms to a rule.

By selecting several modules in this manner, the physical packaging position database 14 is completed in respect of one frame which is selected firstly. Upon completion of the one frame, the next frame is constructed. Thus, for all necessary frames, selection of the frame units and the like and inputting of the physical packaging positions are carried out. Accordingly, in the present embodiment, when the maintenance man performs the system construction or the increase of units, the physical packaging position database 14 can be prepared by selecting the frame unit name and the module name and inputting physical packaging position information of the frame unit. Therefore, in comparison with the conventional system in which all information pieces such as frame unit name, frame name, module name, module main body name and card name are prepared in accordance with many kinds of combinations of units in an exchange in advance of the shipment of the exchange, data preparation and input work can be mitigated greatly and the physical packaging position information can be prepared and stored in the database easily, thereby substantially improving the productivity of the exchange. Further, the physical packaging position information can be changed in consideration of the actual hardware construction by using the information change means and hence the maintainability can also be improved.

As described above, in the event that a logical unit, for example, in the exchange becomes faulty after completion of the physical packaging position database 14, the diagnostic result of the faulty logical unit can be obtained automatically by means of a well-known diagnostic unit (not shown) and the diagnostic result output processing section 15 is started. The diagnostic result output section 15 acquires physical packaging position information of the diagnosed faulty logical unit from the physical packaging database 14 and supplies the physical packaging position information to the graphic display processing section 23.

The graphic display processing section 23 uses the physical packaging position information and graphic display information from the graphic processing database 22 to provide a graphic display on the display unit of the terminal unit. Through this, the physical packaging position of the faulty logical unit is displayed. Accordingly, the user can accurately know the physical packaging position of the faulty unit from the graphic display, thus ensuring that the faulty unit can be specified and interchanged easily and the maintainability can be more improved than that in the conventional system.

FIG. 3 shows another example of the physical packaging position database preparing method. In the example of FIG. 3, physical packaging position information of different frame name and module name is prepared on the basis of the physical packaging position information prepared according to the method described in connection with FIG. 2. The kind of frames in the exchange and the kind of modules carried in the frames are sometimes similar system by system and the present embodiment can be applied suitably to such an instance.

More particularly, data 41 of frame information as shown at (a) in FIG. 3 in including previously prepared physical packaging position information and module information is copied from the physical packaging position database 14 so that data 42 of frame information in which only necessary items (here, as shown by arrow in FIG. 3, the frame unit mane and the frame name) are modified may be generated and thereafter, the updated data is stored in the physical packaging position database 14. Through this, the physical packaging position information stored in the physical packaging position database 14 can be changed easily.

As described above, according to the present invention, a physical packaging position of, for example, a faulty logical unit in the exchange is delivered out of the diagnostic result output section and displayed on the display unit of the terminal unit to permit the maintenance man to accurately know the faulty unit and its physical packaging position from the display, thus more improving the maintainability in the present system than in the conventional system.

Further, according to the present invention, by copying the physical packaging position information of the physical packaging position database and thereafter modifying part of the information to update the physical packaging position information of the physical packaging position database, an updated physical packaging position database can be prepared easily.

Furthermore, according to the present invention, upon the system construction or the increase of units, the user prepares a physical packaging position database by selecting a frame unit name and a module name and inputting physical packaging position information of a frame unit and therefore, the conventional work, in which in advance of the shipment of an exchange, all pieces of information are prepared in accordance with many kinds of combinations of units in the exchange and the information pieces are sequentially stored in the exchange, can be unneeded, thus ensuring that the physical packaging position information can be prepared easily and stored in the database and hence the productivity of the exchange can substantially be improved.

In addition, according to the present invention, the physical packaging position information can be changed in consideration of the actual hardware construction by using the information change software means and consequently, changing of the physical packaging position information can be facilitated and the maintainability can be improved.

What is claimed is:

1. A physical packaging position information processing system comprising an exchange and a terminal unit connected to the exchange, said exchange including:

a physical packaging position database for storing physical packaging position information of units packaged in said exchange; and diagnostic result output software means for delivering physical packaging position information corresponding to a diagnosed unit from said physical packaging position database on the basis of a result of the diagnosis executed when the diagnosed unit becomes faulty, said terminal unit including:

information change software means for desirably changing the physical packaging position information in said physical packaging position database;

a display unit for graphic display; and display processing software means for displaying the physical packaging position information delivered out of said diagnostic result output means on said display unit.

2. A physical packaging position information processing system according to claim 1, wherein said information change software means copies the physical packaging position information of said physical packaging position database and thereafter, modifies part of the copied information to update the physical packaging position information of said physical packaging position database.

3. A physical packaging position information processing system comprising an exchange having exchange proper software and a terminal unit connected to the exchange and having terminal software, said exchange proper software including:

a system fixed database which is common to the whole of the system and which stores, in a hierarchical structure, a name table of frame unit name, frame name and module name and a name table of module main body name and card name carried in the module;

a physical packaging position database for storing physical packaging position information of units packaged in said exchange;

a packaging position preparation processing section for storing externally inputted physical packaging information in said physical packaging position database; and a diagnostic result output processing section for delivering physical packaging position information corresponding to a diagnosed unit from said physical packaging position database on the basis of a result of a diagnosis executed when said diagnosed unit becomes faulty, said terminal software including:

a unit name determination processing section for determining a desired unit name from said system fixed database and storing data of said system fixed database corresponding to the determined unit name, together with physical packaging position information inputted by a user of said terminal unit, in said physical packaging position database through said packaging position preparation processing section;

a graphic processing database for displaying data corresponding to the unit name determined by said unit name determination processing section; and a display processing section for displaying the physical packaging position information from said diagnostic result output processing section on a display unit of said terminal unit on the basis of the data from said graphic processing database.

* * * * *